(12) United States Patent
Boersma et al.

(10) Patent No.: US 9,276,274 B2
(45) Date of Patent: Mar. 1, 2016

(54) VANADIUM FLOW CELL

(71) Applicant: Deeya Energy, Inc., Fremont, CA (US)

(72) Inventors: Reinder J. Boersma, Webster, MA (US); Derek Kwok, Castro Valley, CA (US); Suresh Kumar Surapalan Nair, Fremont, CA (US); Gopalakrishnan R. Parakulam, Cupertino, CA (US)

(73) Assignee: IMERGY POWER SYSTEMS, INC., Fremont, CA (US)

( * ) Notice: Subject to any disclaimer, the term of this patent is extended or adjusted under 35 U.S.C. 154(b) by 0 days.

(21) Appl. No.: 13/842,446

(22) Filed: Mar. 15, 2013

(65) Prior Publication Data

US 2013/0302710 A1    Nov. 14, 2013

Related U.S. Application Data

(60) Provisional application No. 61/645,495, filed on May 10, 2012.

(51) Int. Cl.
 *H01M 8/20* (2006.01)
 *H01M 8/18* (2006.01)
 *H01M 8/02* (2006.01)
 *H01M 8/04* (2006.01)

(52) U.S. Cl.
 CPC ........ *H01M 8/0273* (2013.01); *H01M 8/04074* (2013.01); *H01M 8/188* (2013.01); *H01M 8/20* (2013.01); *H01M 8/04223* (2013.01); *Y02E 60/528* (2013.01)

(58) Field of Classification Search
 USPC ................. 429/120, 434, 435, 436, 101, 105
 See application file for complete search history.

(56) References Cited

U.S. PATENT DOCUMENTS

| 3,788,899 | A * | 1/1974 | Zaromb | ................ 429/405 |
| 7,919,204 | B2 | 4/2011 | Sahu | |
| 7,927,731 | B2 | 4/2011 | Sahu | |
| 2002/0187386 | A1 * | 12/2002 | Sugiura et al. | .................. 429/37 |
| 2003/0118889 | A1 | 6/2003 | Smith | |
| 2009/0274940 | A1 | 11/2009 | Morita et al. | |
| 2010/0136455 | A1 | 6/2010 | Winter | |
| 2010/0291429 | A1 * | 11/2010 | Farmer | ................. 429/120 |
| 2011/0074357 | A1 | 3/2011 | Parakulam et al. | |
| 2012/0040216 | A1 | 2/2012 | Parakulam | |
| 2012/0321920 | A1 * | 12/2012 | Perry et al. | ................. 429/51 |
| 2013/0071714 | A1 * | 3/2013 | Perry et al. | ................. 429/101 |

FOREIGN PATENT DOCUMENTS

| CN | 102306815 A | * | 1/2012 |
| JP | 2000274251 A | * | 10/2000 |
| JP | 2004167334 A | * | 6/2004 |
| WO | WO 2006/045893 A1 | | 5/2006 |
| WO | WO 2012/032368 A1 | | 3/2012 |

OTHER PUBLICATIONS

U.S. Appl. No. 12/577,134, filed Oct. 9, 2009.*
U.S. Appl. No. 12/577,147, filed Oct. 9, 2009.*

(Continued)

*Primary Examiner* — Gregg Cantelmo
(74) *Attorney, Agent, or Firm* — Haynes and Boone, LLP

(57) ABSTRACT

A Flow Cell System that utilizes a Vanadium Chemistry is provided. The flow cell system includes a stack, electrolyte heat exchangers, and a controller executing a state machine.

8 Claims, 12 Drawing Sheets

(56) References Cited

OTHER PUBLICATIONS

U.S. Appl. No. 12/790,749, filed May 28, 2010.*
U.S. Appl. No. 12/790,793, filed May 28, 2010.*
U.S. Appl. No. 12/790,794, filed May 28, 2010.*
U.S. Appl. No. 13/350,424, filed Jan. 13, 2012.*
U.S. Appl. No. 13/651,230, filed Oct. 12, 2012.*
Abstract CN 102306815A (Jan. 2012).*
PCT International Search Report and Written Opinion mailed Oct. 24, 2013, in related International Application No. PCT/US2013/040214.

* cited by examiner

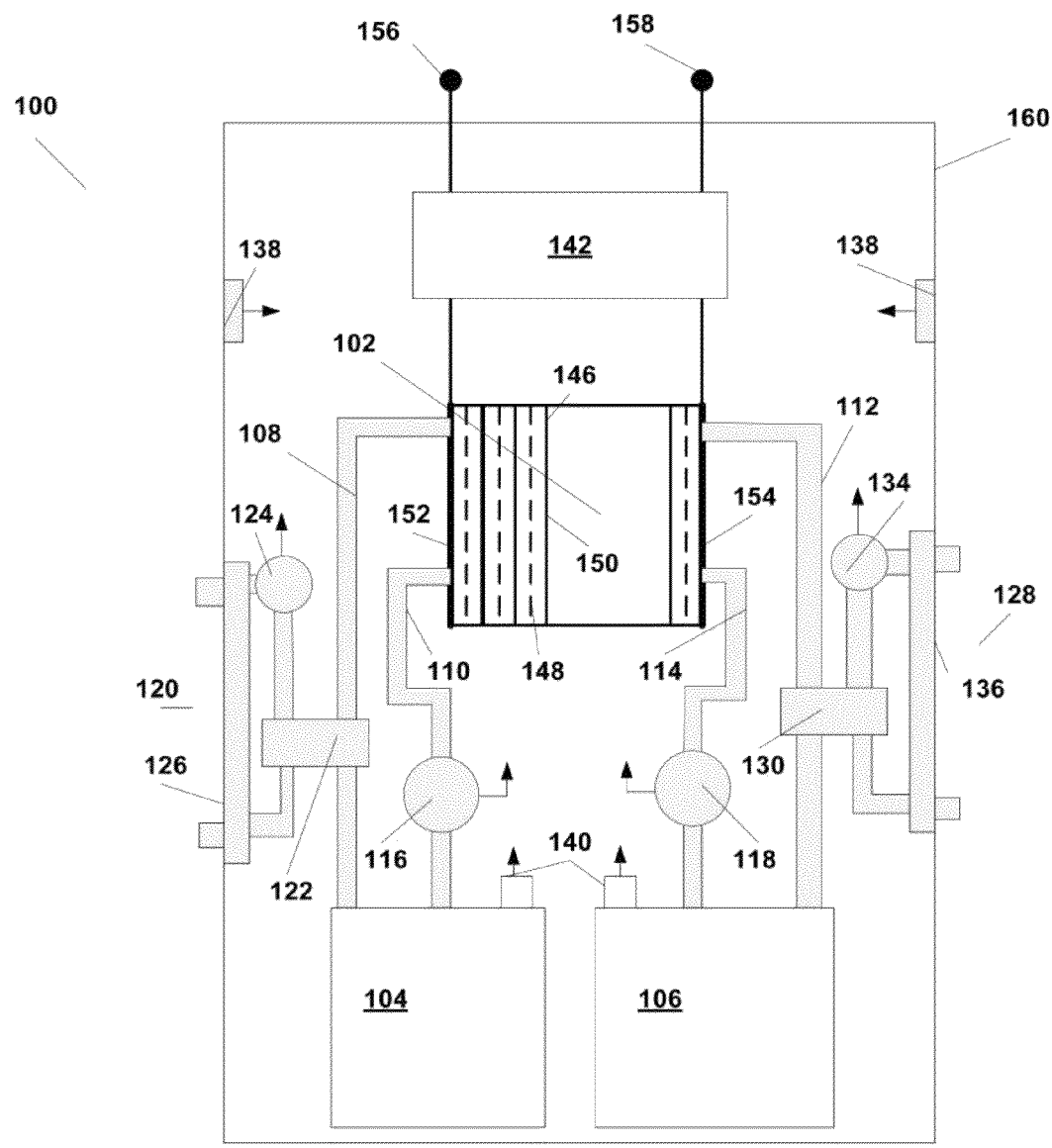
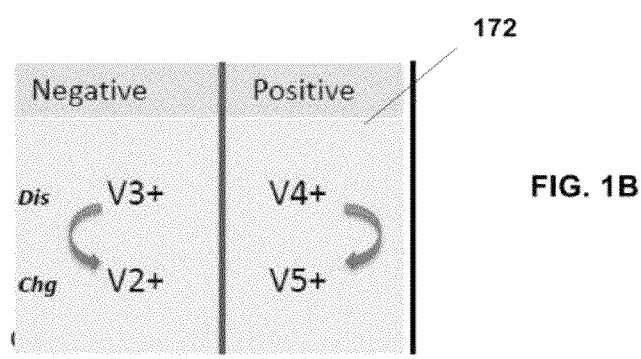
FIG. 1A
FIG. 1B

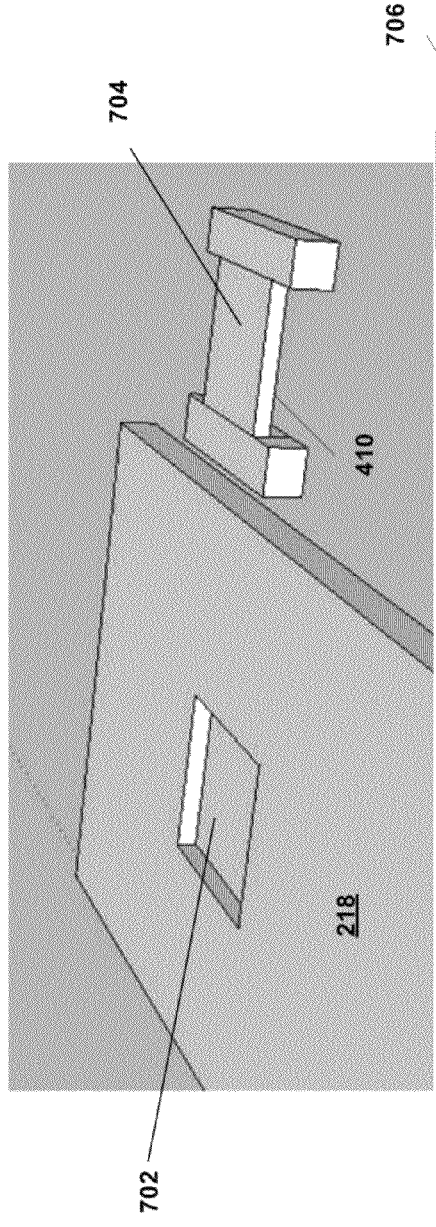
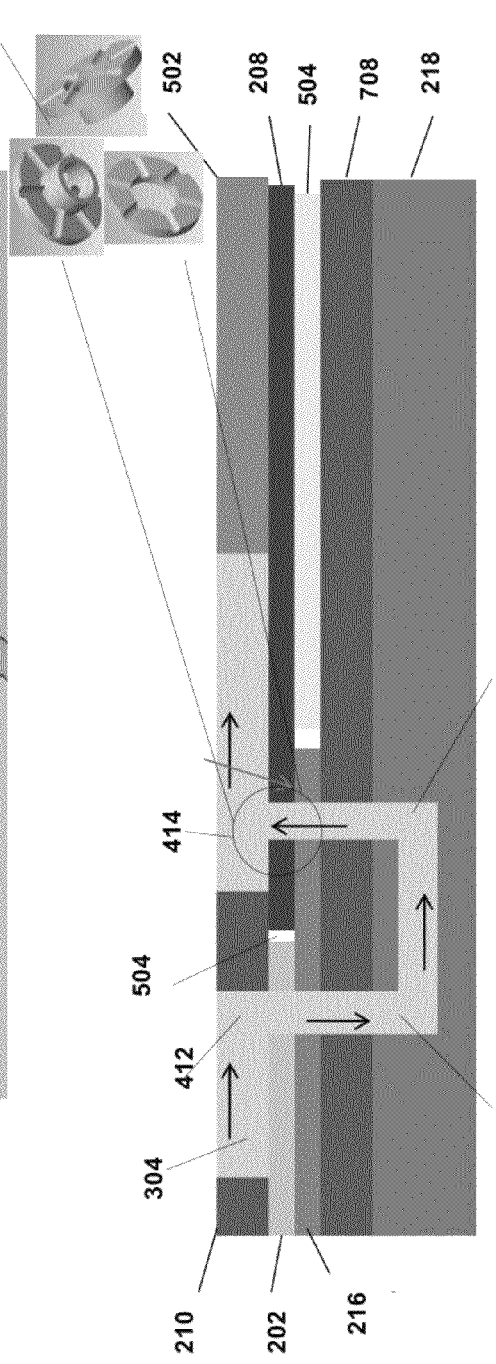

VANADIUM FLOW CELL

REFERENCE TO RELATED APPLICATIONS

The present invention claims priority to U.S. Provisional Application No. 61/645,495, entitled "Vanadium Flow Cell", filed on May 10, 2012, the content of which are herein incorporated by reference in its entirety.

BACKGROUND

1. Technical Field

The present disclosure relates to a flow cell system and, in particular, to a flow cell system that uses a Vanadium based chemistry.

2. Discussion of Related Art

There is an increasing demand for novel and innovative electric power storage systems. Redox flow cell batteries have become an attractive means for such energy storage. In certain applications, a redox flow cell battery may include one or more redox flow cells. Each of the redox flow cells may include positive and negative electrodes disposed in separate half-cell compartments. The two half-cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a redox flow cell battery operates in an aqueous electrolyte environment.

In order to provide a consistent supply of energy, it is important that many of the components of the redox flow cell battery system are performing properly. Redox flow cell battery performance, for example, may change based on parameters such as the state of charge, temperature, electrolyte level, concentration of electrolyte and fault conditions such as leaks, pump problems, and power supply failure for powering electronics.

Vanadium based flow cell system have been proposed for some time. However, there have been many challenges in developing a Vanadium based system that would be economically feasible. These challenges include, for example, the high cost of the Vanadium electrolyte, the high cost of appropriate membranes, the low energy density of dilute electrolyte, thermal management, impurity levels in the Vanadium, inconsistent performance, stack leakage, membrane performance such as fouling, electrode performance such as delamination and oxidation, rebalance cell technologies, and system monitoring and operation.

Therefore, there is a need for better redox flow cell battery systems.

SUMMARY

In accordance with some embodiments, a flow system includes a flow stack, a cooling heat exchanger, and a controller executing a state machine. A stack for a flow cell system having an end plate structure according to some embodiments includes a conducting plate; an insulating end plate, the insulating end plate having a pocket to receive an insert; a frame with an electrode; a felt; and a gasket formed over the felt, wherein a tunnel is formed in the fluid flow across the felt. An electrolyte heat exchanger according to some embodiments of the present invention includes flow field media; and heat transfer sheets separating the flow field media, wherein electrolyte and a heat exchange fluid can be flowed through the electrolyte heat exchanger. A controller according to the present invention can include an initialization state; a charge state; a discharge state; a float state; a hibernate state; and a shutdown state, wherein transitions are made between the states.

These and other embodiments will be described in further detail below with respect to the following figures.

BRIEF DESCRIPTION OF THE DRAWINGS

FIG. 1A illustrates a flow cell system according to some embodiments of the present invention.

FIG. 1B illustrates the chemistry for a flow cell system as shown in FIG. 1A.

FIGS. 7A and 7B further illustrate an end plate according to some embodiments of the present invention.

Figure 2:
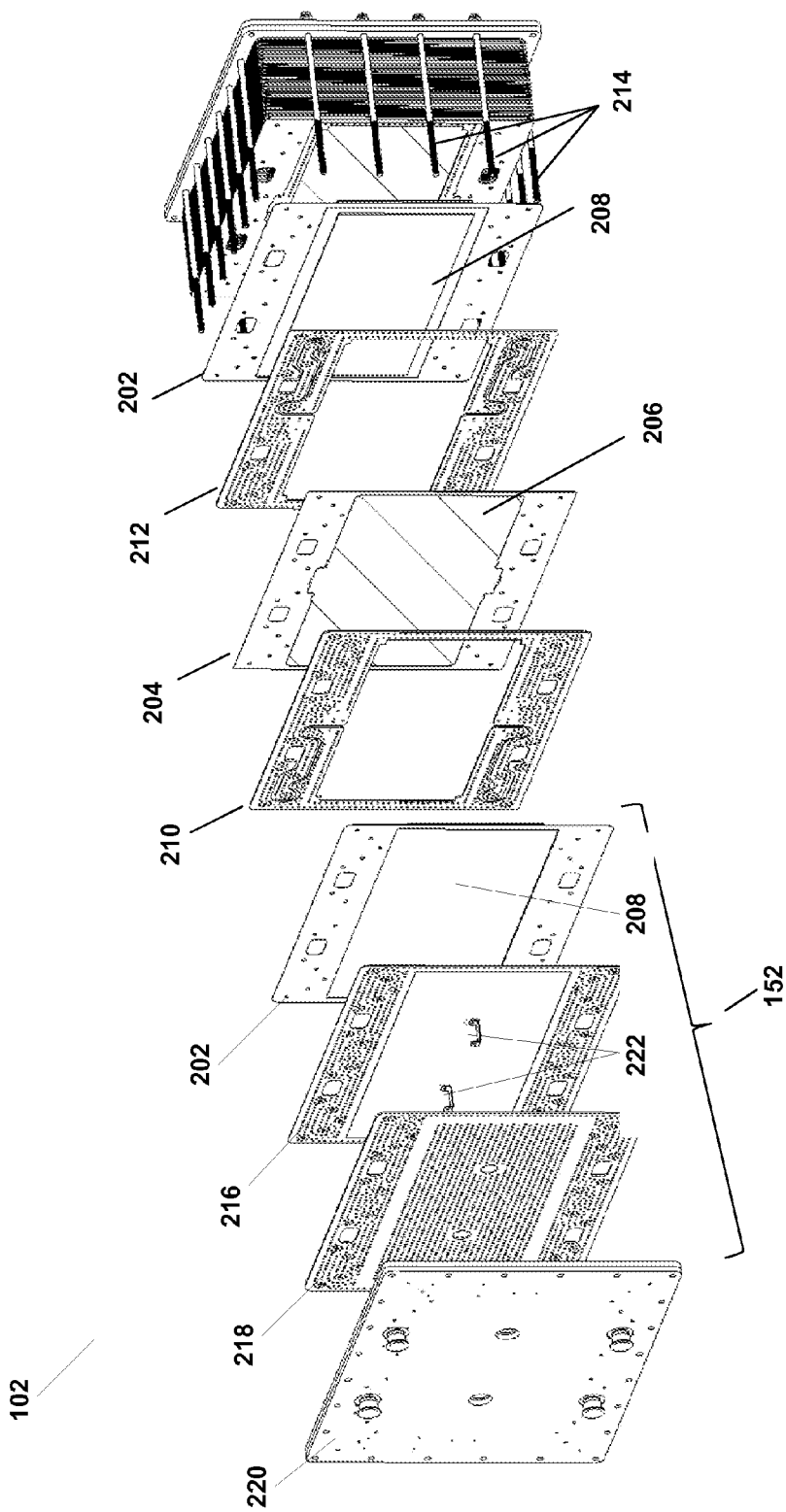
FIG. 2 illustrates an example of a stack according to some embodiments of the present invention.

The drawings may be better understood by reading the following detailed description. The drawings are not to scale.

DETAILED DESCRIPTION

A Vanadium Flow Cell system that utilizes vanadium based chemistry is disclosed. Groups have investigated vanadium/vanadium electrolytes in $H_2SO_4$. In that effort, $V_2O_5 + V_2O_3 + H_2SO_4$ yields $VOSO_4$. An electrochemical reduction of $V_2O_5 + H_2SO_4$ can also yield $VOSO_4$. However, preparation of the electrolyte has proved difficult and impractical. Another group has tried a mixture of H2SO4 and HCl by dissolving $VOSO_4$ in HCl. However, again the electrolyte has proved to be expensive and impractical to prepare sulfate free formulation.

FIG. 1A conceptually illustrates a flow cell system 100 according to some embodiments of the present invention. As shown in FIG. 1A, flow cell system 100 includes a stack 102. Stack 102 is a stacked arrangement of individual flow cells 146, each flow cell 146 including two half-cells separated by a membrane 148. Membrane 148 can be an ion permeable membrane as described, for example, in U.S. Pat. No. 7,927,731, which is herein incorporated by reference in its entirety. Further, each half-cell of cell 146 includes an electrode 150. The end cells include end electrodes 152 and 154. A controller 142 is coupled to end electrodes 152 and 154 to control charge into and out of stack 102. Controller 142 provides charge from stack 102 to terminals 156 and 158 when system 100 is discharging and receives charge from terminals 156 and 158 to provide to stack 102 when charging. Terminals 156 and 158 are, in turn, coupled to supply current to a load when system 100 is discharging and coupled to a current source (e.g., a wind generator, solar cells, diesel generator, power grid, or other source of power) for charging of system 100.

As illustrated in FIG. 1A, electrolyte solutions are flowed through each of the half cells of cells 146. A catholyte is flowed through one of the half-cells and an anolyte is flowed through the other of the half cells. Although other chemistries have been proposed for use in system 100, in some embodiments a Vanadium based chemistry is utilized to hold charge and provide charge from stack 102. The Vanadium chemistry involves the reaction of $V^{3+}+e^-\rightarrow V^{2+}$ in the negative half-cell of cell 146 and $VO^{2+}+H_2O\rightarrow VO_2^++2H^++e^- (V^{4+}\rightarrow V^{5+}+e^-)$ in the positive half cell of cell 146. The theoretical open circuit voltage of each cell in stack 102 utilizing the Vanadium chemistry is then 1.25V, (−0.25 V from one half-cell and 1.00V from the other half-cell 108). The ions H+ and Cl− may traverse membrane 148 during the reaction. A Vanadium electrolyte that can be utilized in system 100 is further described in U.S. patent application Ser. No. 13/651,230, which is herein incorporated by reference in its entirety.

As illustrated in FIG. 1A, the electrolytes are stored in tanks 104 and 106. Tank 104 is fluidly coupled to stack 102 through pipes 108 and 110. The electrolyte stored in tank 104 can be pumped through stack 102 by a pump 116. Similarly, tank 106 is fluidly coupled to stack 102 through pipes 112 and 114. Electrolyte from tank 106 can be pumped through stack 102 by pump 118.

As shown in FIG. 1A, system 100 is housed in a cabinet 160. During the operation of system 100, a significant amount of heat may be generated by system 100, and particularly in stack 102. In some embodiments, cooling fans 138 may be provided. A temperature control system according to some embodiments has been described in U.S. Pat. No. 7,919,204, which is herein incorporated by reference in its entirety.

As is further shown in FIG. 1A, system 100 can include electrolyte cooling systems 120 and 128, which cools the electrolyte returning from stack 102 into tanks 104 and 106, respectively. As shown, electrolyte from stack 102 flowing through pipe 108 can flow through electrolyte heat exchanger 122. Similarly, electrolyte from stack 102 that flows through pipe 112 can flow through electrolyte heat exchanger 130. Each of exchangers 122 and 130 can cool electrolytes utilizing a cooling liquid that is flowed through electrolyte exchangers 122 and 130 and itself cooled by heat exchangers 126 and 136, respectively. Pumps 124 and 134, respectively, can circulate the cooling fluid through heat exchangers 126 and 136, respectively, and through heat exchangers 126 and 136, respectively.

As is further illustrated in FIG. 1A, a control system 142 controls various aspects of system 100. Control system 142 controls the operation of stack 102 and electrolyte pumps 116 and 118 to charge and discharge system 100. Control system 142 can also control cooling fans 138 and cooling fluid pumps 124 and 134 to control the cooling of system 100. Control system 142 can receive signals from various sensors 140 that provide data regard the operation of system 100. Control system 142 can include, for example, a fluid level sensor such as that described in U.S. patent application Ser. No. 12/577, 147; hydrogen chlorine level detectors such as that described in U.S. patent application Ser. No. 12/790,794; or optical leak detectors such as that described in U.S. patent application Ser. No. 12/790,749, each of which is herein incorporated by reference in its entirety.

As discussed above, a Vanadium in HCL electrolyte can be utilized in system 100, as is further described in U.S. patent application Ser. No. 13/651,230. The following reactions may occur in electrochemical cells 146 of stack 102: In the positive half-cell (catholyte)

$$VOCl_2+H_2O+Cl^-\rightarrow VO_2Cl+2HCl+e^-;$$

In the negative half-cell (Anolyte)

$$VCl_3+e^-\rightarrow VCl_2+Cl^-; \text{ and}$$

In the full cell 146

$$VOCl_2+H_2O+VCl_3\rightarrow VO_2Cl+2HCl+VCl_2.$$

These reactions are illustrated diagrammatically in reaction diagram 172 in FIG. 1B. The cell shown in FIG. 1A may utilize different reactions and different electrolyte chemistries than those described above. The above description is for exemplary purposes only.

FIG. 2 illustrates an embodiment of stack 102 such as that described, for example, in U.S. patent application Ser. No. 12/577,134 and U.S. patent application Ser. No. 13/350,424, each of which is herein incorporated by reference in its entirety. As shown in FIG. 2, stack 102 is essentially constructed from electrode elements 202, membrane elements 204, and gaskets 210 and 212. As illustrated in FIG. 2, electrode elements 202 include a frame on which an electrode material 208 is attached. Membrane elements 204 include a frame on which the membrane 206 is attached. Gaskets 210 and 212 create electrolyte fluid flows between membranes 206 and electrodes 208. As is illustrated, gaskets 210 and 212 may be identically constructed, but rotated by 180 degrees. There are passages formed such that the two electrolytes can be separately directed into the appropriate flow fields between elements.

FIG. 2 further illustrates terminal 152. Terminal 152 includes an electrode 208, which in this configuration can be a charge collector. Components 216 and 218 are sandwiched between electrode 208 and end plate 220. Components 216 and 218 may be insulating seals. End plate 220 may be an aluminum end plate. Electrodes may make contact with electrode 208 and extend from end plate 220. Stack 102 is held together and tensioned by bolts 214.

Figure 3:
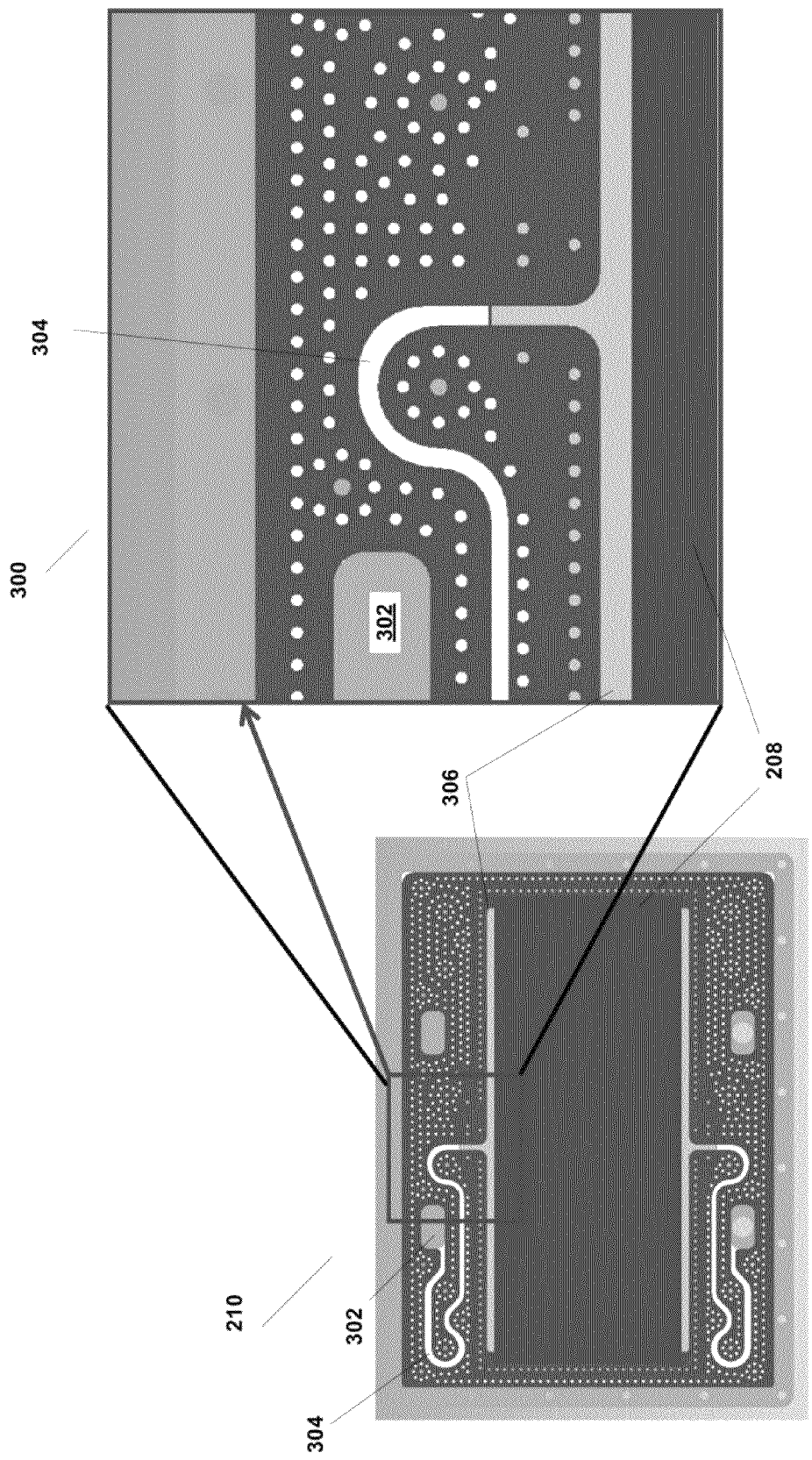
FIG. 3 illustrates an expanded depiction of a portion of a gasket in the stack illustrated in FIG. 2.

FIG. 3 illustrates an embodiment of gasket 210 at the interface with an electrode 208, which is a current collector, at terminal 152. As illustrated by blow-up 300, the fluid flow interface includes a channel 304 that carries electrolytic fluid between port 302 and graphite current collector 208 through plastic sleeve 306 of gasket 210. Over time, there has been a tendency for electrolyte to seep into the interface between graphite current collector 208 and plastic sleeve 306, eventually causing electrolyte to leak through the current collector terminal 152.

Figure 4:
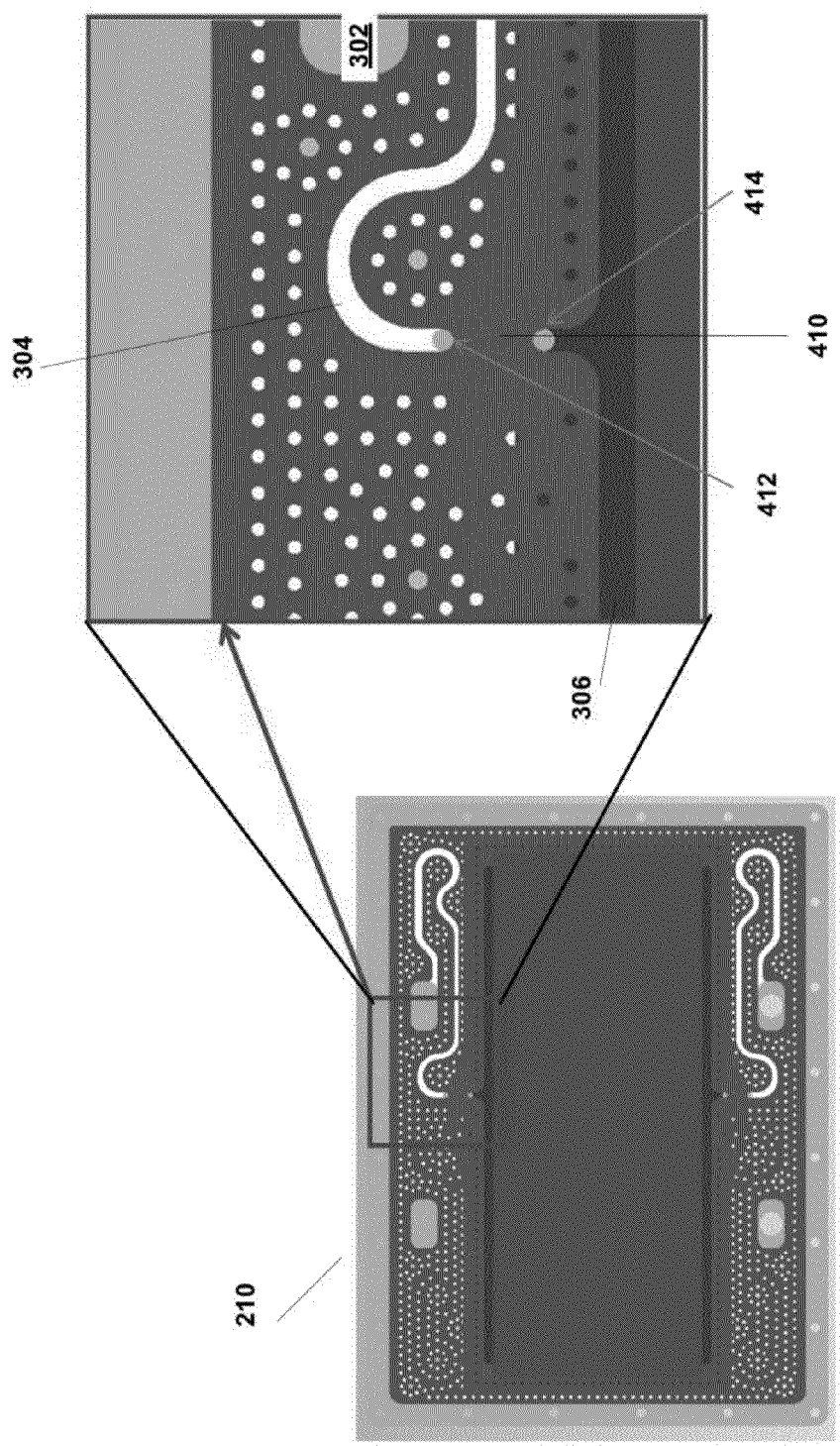
FIG. 4 illustrates an embodiment of end plate according to some embodiments of the present invention.

FIG. 4 illustrates an interface between gasket 210 and the current collector 208 of terminal 152 according to some embodiments of the present invention. As is illustrated in FIG. 4, a tunnel 410 is provided. Tunnel 410, which includes an entrance 412 and an exit 414, creates a bypass on the flow path so that the interface between the graphite current collector 208 and the sleeve 306 is not exposed to the electrolyte and hence eliminating the possibility of an electrolyte leak. As shown in FIG. 4, tunnel 410 includes an entry 412 and an exit 414, where the entry receives fluid from channel 304 in gasket 210 and the exit provides the fluid to the graphite current collector 208 through sleeve 306.

Figure 5:
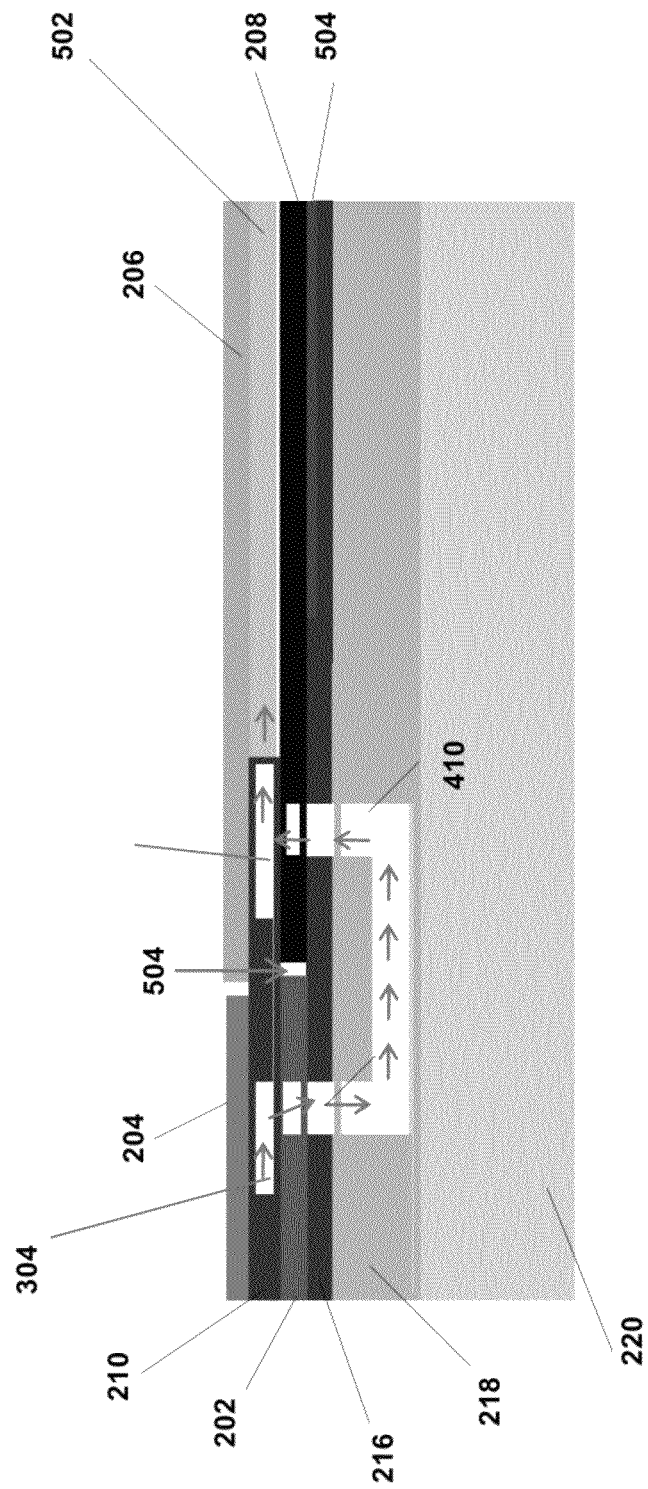
FIG. 5 illustrates a cross section of an end plate according to some embodiments of the present invention.
Figure 6:
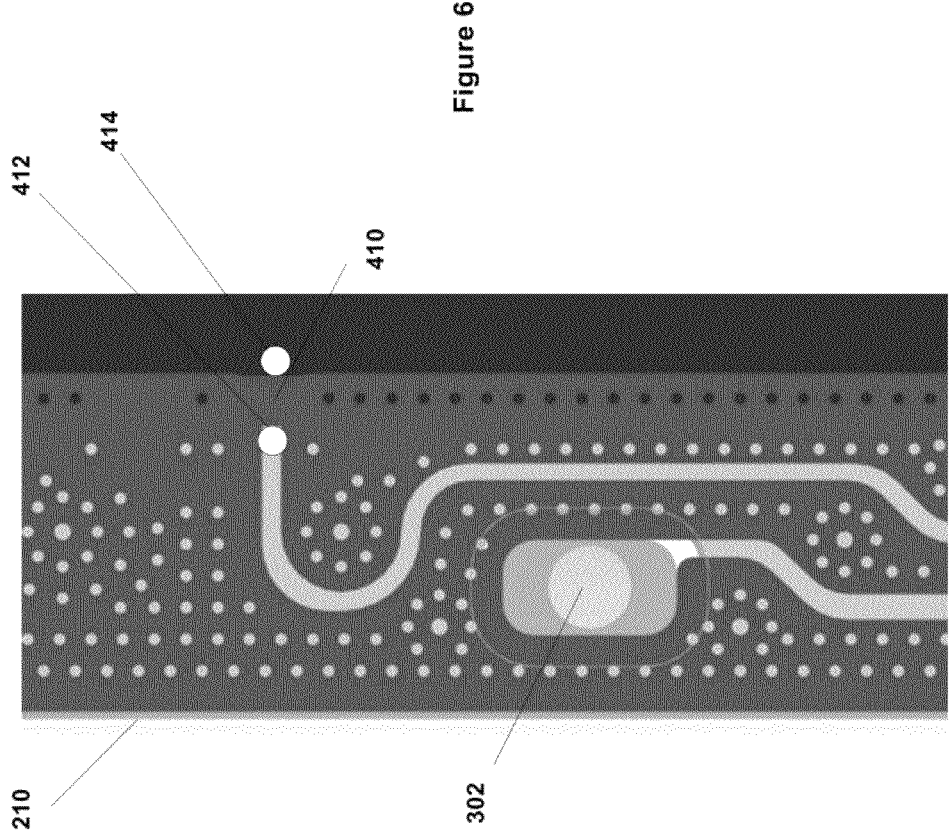
FIG. 6 further illustrates an end plate according to some embodiments of the present invention.

FIG. 5 illustrates a cross section of an end of the stack 102. FIG. 5 includes a membrane element 204, a gasket 210, an electrode element 202, and end terminal 152. As shown in FIG. 5, from top to bottom, the first layer is the membrane layer, with frame 204 and membrane 206. The gasket 210 is next, gasket 210 frames a felt 502 that maintains the flow. The next layer down is another frame 202 with a current collector electrode 208, which for example can be formed of Titanium 504 surrounded by a frame, which can be formed of Santoprene. Flow from the manifold enters the felt 502 through a tunnel 410 through the insulating endplate 218, by-passing the interface edge between the graphite 208 bipolar plate and the polypropylene sleeve of frame 202. The insulating end plate 218 may be, for example, a PVC plate. The next layer is an End gasket 216, which can be formed of Santoprene, that separates the current collector from the layer below. The next layer is the insulating end plate 218. A pressure plate 220, which can be formed of aluminum, then completes the end of the stack. As is shown in FIG. 5, tunnel 410 is formed in end plate 218 with passages through frame 204 and gasket 210. The normal force on the seam between the graphite and plastic frame layers keeps that seam sealed. As shown in FIG. 5, the flow by-pass (tunnel) 410 is created by having a pocket in the end plate 218 and a bridge support, which can be formed of PVC. In some embodiments, this structure seals the current collector from electrolyte without requirement for glue. FIG. 6 illustrates the flow from the manifold 302 to tunnel 410 and through entry 412 and exit 414 from tunnel 410.

Addition of tunnel 410 to the end terminal 156 improves the labyrinth channel while not utilizing additional end plates. Additionally, no stack thickness increase is needed. Marginal increase in costs are realized by adding support around the entry 412 and exit 414 holes created in the graphite 208 for the tunnel, in machining a blind rectangular pocket on present PVC end plates 216, and in using an injection molded CPVC or other compatible plastic insert to provide the conduit for flow.

FIGS. 7A and 7B further illustrate construction of an insert pocket 702 formed in end plate 218. As is illustrated in FIG. 7A, a pocket 702 is formed in the endplate and an insert 704, which provides tunnel 410, is formed that seats in pocket 702.

The resulting tunnel 410 is shown in FIG. 7B. As shown in FIG. 7B, end plate 218 includes insert 704. As shown in FIG. 7B, a gasket layer 708 can be inserted between end plate 218 and current collector layer 216 with titanium layer 504. Various supports 706 for can be applied in exit 414 through graphite layer 208 to provide support.

Figure 8A:
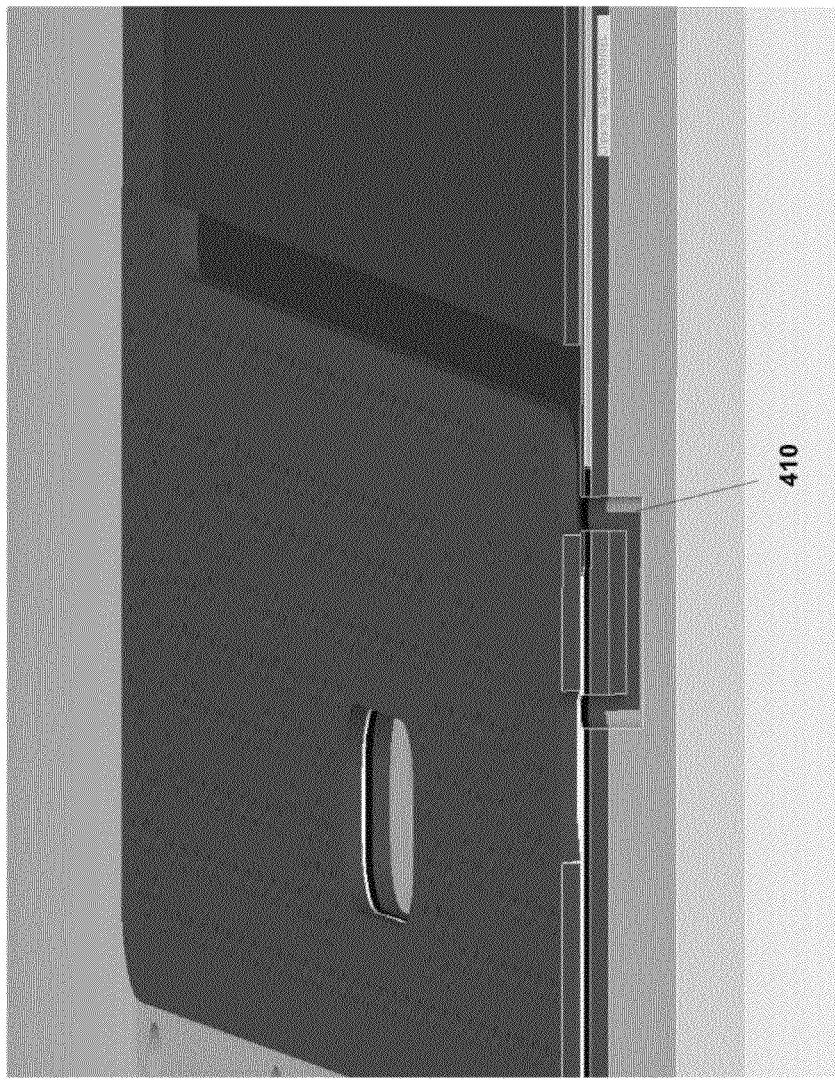
FIGS. 8A and 8B further illustrate an end plate according to some embodiments of the present invention.
Figure 8B:
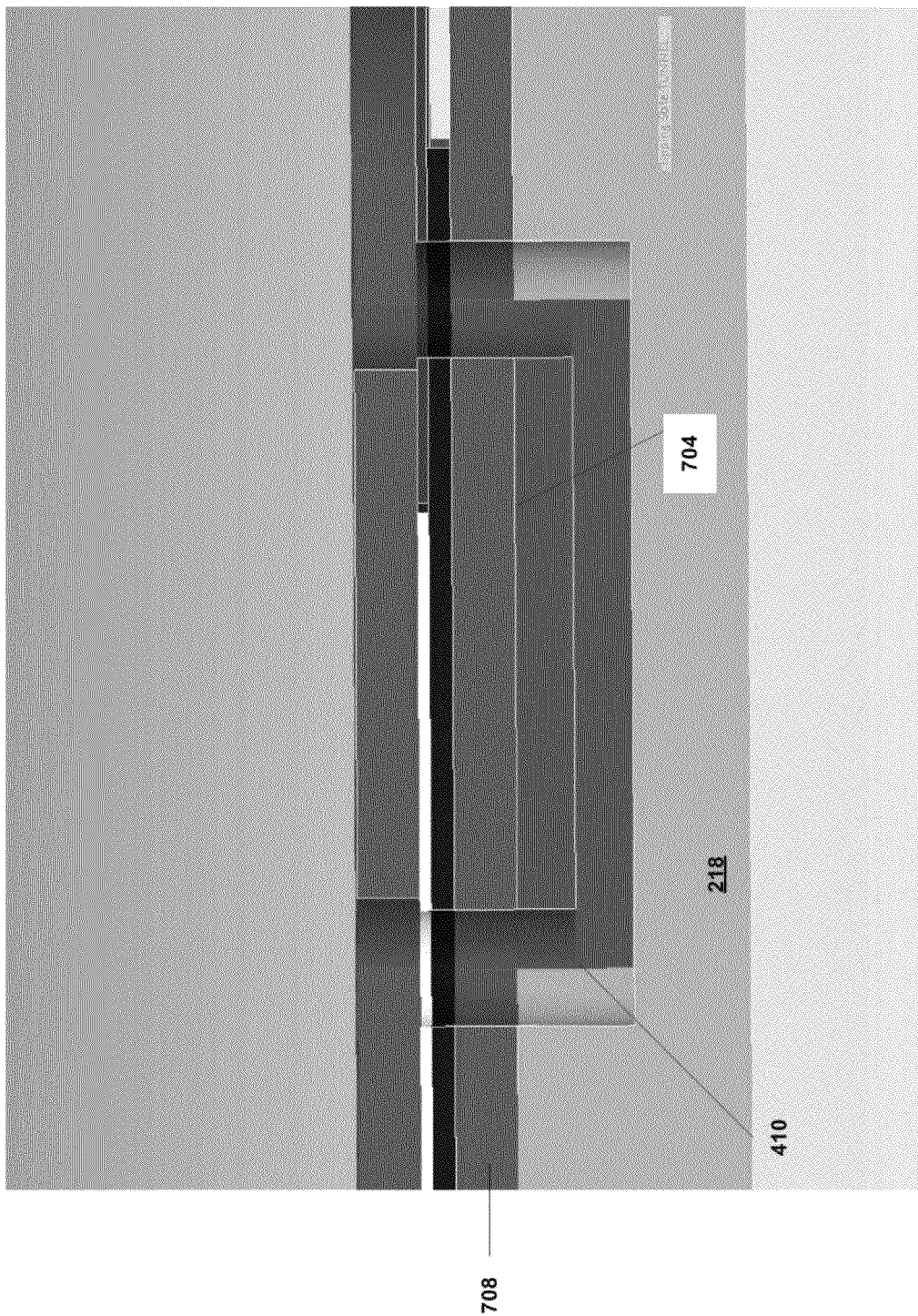

FIGS. 8A and 8B further illustrate the insert provided in the pocket of the end plate. The compressive force goes through the top of the insert above which there is Santoprene. This force seals the gap between Graphite plate 208 and PP Sleeve.

Figure 9A:
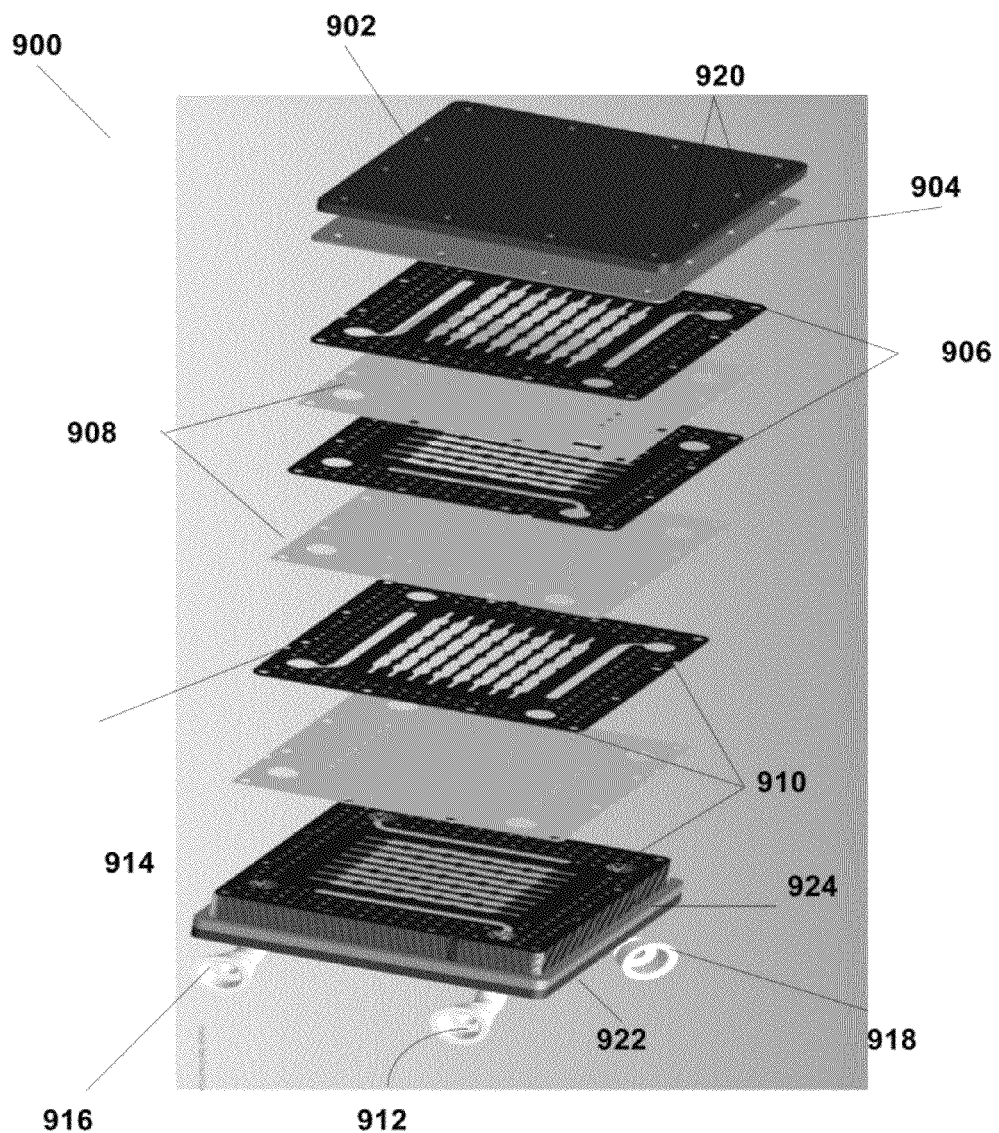
FIGS. 9A and 9B illustrate some embodiments of an electrolyte heat exchanger as illustrated in FIG. 1A.

As is further illustrated in FIG. 1A, in some embodiments heat exchangers 122 and 130 are provided to cool electrolytes as they return to tanks 104 and 106, respectively. FIG. 9A illustrates an embodiment of an electrolyte heat exchanger, which can be one of heat exchangers 122 or 130, according to some embodiments of the present invention. As discussed above flow batteries produce heat as well as electricity. This heat should be managed in order to optimize operation of the flow cell. Due to the aggressive nature of the electrolyte, more conventional heat exchangers made of metal cannot be used for cooling the electrolyte. Therefore, heat exchanger 900 is formed of primarily of plastics.

Some plastic heat exchangers were identified, but the cost was found to be excessive and the units were large. The heat exchangers that were investigated were all of the type called tube-in-shell heat exchangers. However, similar materials can be utilized in heat exchanger 900 as is utilized in the remainder of stack 102 because those materials withstand the chemical conditions presented by the electrolytes.

FIG. 9A illustrates a plate type heat exchanger 900 according to some embodiments of the present invention. Heat exchanger 900 uses the flow battery materials and is unique in its design. Heat exchanger 900 is a liquid-to-liquid plate type heat exchanger that transfers the process heat in the electrolyte to a conventional cooling liquid, such as glycol for example. The topology of the design can also be applied for flow batteries; modifications are required such as replacing the flow separators by membranes and bipolar plates.

As shown in FIG. 9A, heat exchanger 900 is formed of alternating sheets of particular shape and size that make up the heat exchanging section. The package is flanked by a pair of pressure plates that compress the package. These have holes to accommodate tie rods and springs. In particular, as shown in FIG. 9A, heat exchanger 900 is formed between pressure plates 902 and 922. Pressure plates 902 and 922 include aligned holes 920 that accommodate tie rods and springs that hold and seal heat exchanger 900. As shown in FIG. 9A, a gasket 904 can be seated against pressure plate 902 and also include holes 920. Gasket 924 can be seated against pressure plate 922 and includes holes 920. Between gasket 924 and 920, flow field media 906 and heat transfer sheets 908 are positioned. Flow field media 906 is rotated by 90 degrees in each layer and each flow field media 906 is separated from the next flow field media 906 by a heat transfer sheet 908. Each of the heat transfer sheets 908 and the flow field media 906 includes manifolds 910 that all fluid to travel throughout heat exchanger 900. Pressure sheet 902 and gasket 904 do not include manifolds and seals the manifolds. Pressure sheet 922 and gasket 924 include input ports 912, 913, 916, and 918 to allow for ingress and egress of two media, one being a cooling medium and the other an electrolyte to be cooled.

When the flow medium enters inlet port 1 912 it flows through one of manifold channels 910 and then into a manifolding section within a flowfield in those flowfield media 906 that are oriented to receive and distribute the flow media from port 912. The flow medium flow through flow media 906 in contact with heat transfer sheets 908. On the opposite side of the heat transfer sheets 908, the other flow medium is flowing in contact with heat transfer sheets 908. The flow field is identical in shape and size as the first mentioned flow field but is rotated to obtain the orientation as shown. The other medium that is entering through port 2 916 follows a similar path. The fluids always stay separated and heat is transferred from one of the fluid media to the other through the heat transfer sheets. As shown in FIG. 9A, flow medium 1 enters through inlet port 912 and exits through outlet port 914 and medium 2 enters through inlet port 916 and exits through outlet port 918.

The heat transferring sheets 908 can be made of plastics like polyethylene, polypropylene, pvdf, teflon, hard rubber etc. The flow fields 906 can be made of a softer material such as a soft santoprene. Alternating hard and soft materials ensures sealing between opposing liquids and the environment.

The embodiment of heat exchanger 900 as illustrated in FIG. 9A employs only two different components that are two dimensional and for this reason can be fabricated at low cost. The number of alternating sheets can be varied easily to accommodate different heat transfer requirements. Assembly is easy, no special techniques are required. As common with metallic plate heat exchangers, heat exchanger 900 is compact compared to similarly rated tube-in shell-heat exchangers.

Another embodiment of heat exchanger 900 is where the flow field 906, made of a soft rubber in the previous embodiment, is replaced with a hard plastic material. The rubber performs a sealing function which, if replaced by a hard plastic, is lost. The sealing function can be replaced by gluing or welding the layers together. Elimination of the rubber may reduce cost and contamination due to the presence of rubber is eliminated.

Figure 9B:
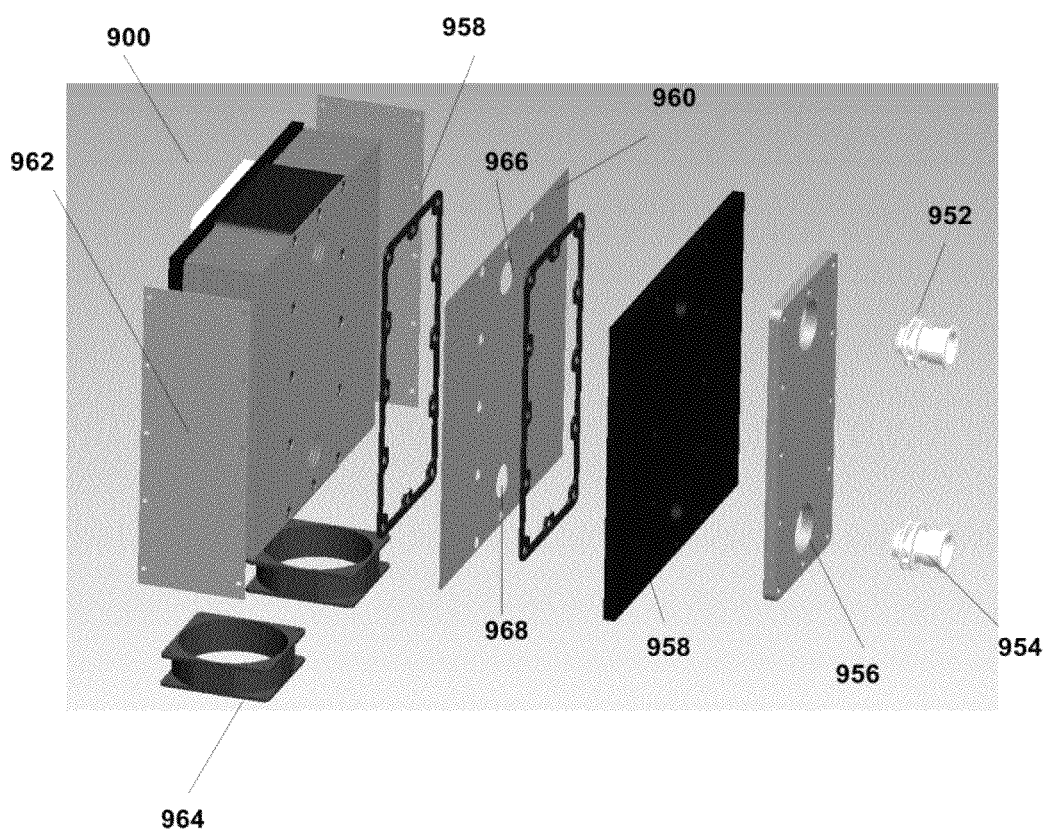

In another embodiment of the heat exchanger 900, the electrolyte exchanges heat with air and therefore does not utilize an intermediate liquid loop. FIG. 9B illustrates an exploded view of such an electrolyte heat exchanger 900. As shown in FIG. 9B, Electrolyte flows between graphite sheets 960, departing from and collecting into common manifold channels 966 and 968. The graphite sheets 960 are very good thermal conductors, particularly in the directions of the plane, which is due to its structure. The electrolyte is contained by rubber sheets 958 of particular size and shape with the purpose of directing and containing the flow through the structure that arises by stacking of graphite 960 and rubber sheets 958. The graphite sheets 960 extend out from the rubber sheets 958 thus allowing only heat and not electrolyte to be transferred to the external environment. Heat exchanger 900 is formed with end plate 958 and pressure plate 956. Side plates 962 may be utilized to direct the flow of air.

As is further shown in FIG. 9B, electrolyte is flowed into and out of heat exchanger 900 through ports 952 and 954. Air flow from forced convection fans 964 provides for removal of the heat. In certain embodiments however the heat can be removed passively by orientating the graphite sheets 960 vertically and air let density differences drive the process. In this approach the fan 964 may be omitted.

The electrolyte flow is driven by an external pump that is chemically compatible with the highly aggressive electrolyte. Positive displacement pumps as well as centrifugal pumps are in existence that have this compatibility. Generally centrifugal pumps are preferred because of their longer lifetime. A disadvantage is that these pumps need to be primed. Priming in this case means that the pump needs to be filled with liquid before it can perform its function. Automated and manual priming methods are well known and by ensuring that both electrolyte in and outlets are always below the liquid level, priming will be needed only during commissioning and for servicing.

Figure 10:
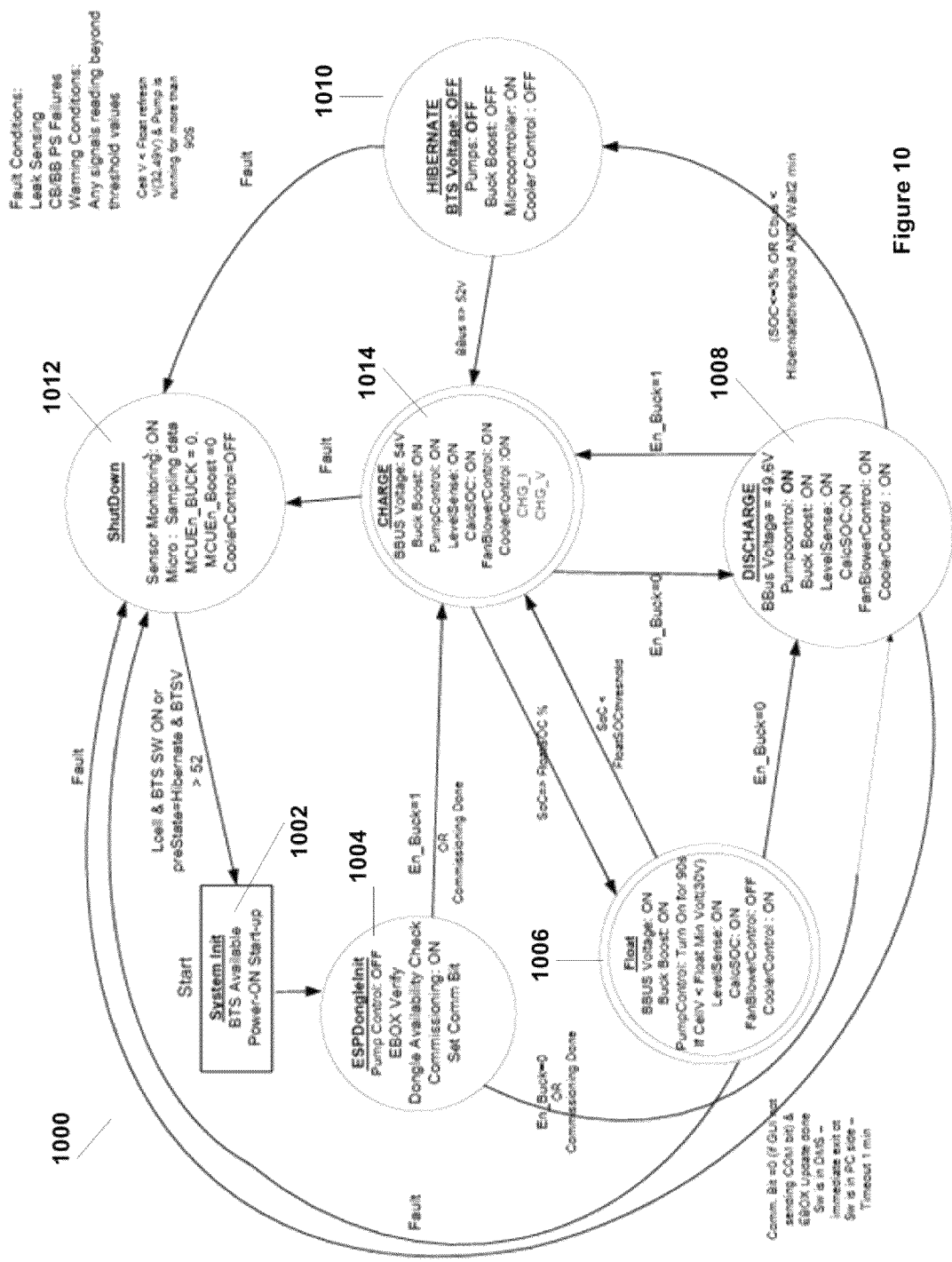
FIG. 10 illustrates a state machine that can be utilized to control the flow cell system shown in FIG. 1A.

FIG. 10 illustrates a state function 1000 according to some embodiments of the present invention that can be executed on controller 142 as shown in FIG. 1. Control systems for flow cells have been previously described in U.S. patent application Ser. No. 12/790,793, which is herein incorporated by reference in its entirety.

As shown in FIG. 10, controller 142 starts in system initialization 1002 on power on. In system initialization state 1002, all internal registers, memories and devices external to controller 142 are initialized for start up. Further, all hardware components are set to default states. From the system initialization state 1002, state function 1000 transitions to the ESPDongleInit state 1004.

In the ESPDongleInit state 1004, controller 142 checks for the presence of a dongle and, if not present, state function 1000 provides a warning and exits to either charge state 1014 or discharge state 1008. If the dongle is present, then the Redox Flow Battery System parameters are read from the Dongle. If a Comm bit is set, then it communicates with the external Commissioning program. It updates the system components, verifies if the Ebox was tested, checks whether any boards in the Ebox have been changed, sends out server information from the Dongle for registration if the Dongle is not registered, and waits for a time ack from the DMS board. The wait times out in one minute. From the ESPDongleINit state 1004, state function 1000 transitions to either the charge state 1014 or the discharge state 1008 depending on the En_Buck signal and DongleExBit. The DongleExbit is set when the timeout occurs or when the commissioning process is done.

In the Charge State 1014, stack 102 is charged. In general, power is taken from the BBus and is delivered to stack 102 through a constant current charging. In particular, the charging current is determined by the system type information that was obtained by reading the Dongle in the DongleInit state 1004. The following functions are then performed: The pumps, fans and blowers are all turned ON; Charging current is ramped by interaction with the Buck boost boards; The level control algorithm is initialized and is functional; The SoC of the system is calculated once the steady charging current is established (the stack voltage can be used for calculating the SoC); The ESR of the System is calculated once the SoC of the System crosses the SoCthreshold; The temperature of the Electrolyte is recorded; The Cooling system (heat exchanger) algorithm is turned on based on the electrolyte temperature. Leak sensors are continuously monitored for any leaks. The following components are monitored, recorded, and reported: All fans and blower currents; All power supplies voltages on the control board; All power supplies voltages on the Buck boost boards; The temperature of the Ebox, ESP ambient and outside ESP ambient temperatures; The Bbus voltage; and External sensors like the Diesel Generator Sensor or the Electricity Board Sensor.

In discharge state 1008, the power is delivered to the Bbus from stack 102. The En-Buck signal changes from "1" to "0" when the Bbus voltage falls below the threshold voltage. Based on the En-Buck signal status the switching to Discharge state 1008 happens. Discharge state 1008 performs all of the functions of charging state 1014 except that charging current control does not happen; ESR calculation does not happen; PFC to control the Diesel Generator is performed; and if ABB is turned ON it is turned off if the SoC is high.

Float state 1006 is transitioned to from Charge state 1014 when SOC is greater than a FloatSoC value. The FloatSoC is set up by the commissioning program or by the FRP system in the System Dongle. The Buck Boost is in the ON state and is kept ready to discharge in case BBus power disappears or falls below a threshold value. In Float state 1006, the charging current is stopped; pumps are stopped; and the fans and blowers are stopped. The temperature of the Electrolyte is recorded, the cooling system algorithm is on and the cooling system is on based on the Electrolyte temperature, the leak sensors are monitored for any leaks, and the components are monitored, recorded, and reported as was done in charge state 1014. Since the pumps are stopped, the Electrolyte in the Stack does not drain. But the Stack voltage slowly decays due to the Self discharge process. The Stack voltage is continuously monitored and when the Stack voltage falls below a threshold voltage the pumps are turned ON for about 90 minutes. During this time fresh electrolyte is provided into the Stack. The SoC of the Electrolyte is calculated when the pumps are running. Once the pumps stop the fresh electrolyte stays in the stack and hence the Stack voltage is going to be higher than the threshold voltage. The Stack voltage now slowly self discharges and the voltage falls below the threshold voltage and then the pumps turn on again. This process keeps repeating until the SoC of the System falls below a threshold SoC. Once this falls below the threshold SoC the System returns to Charge mode 1014.

Hibernate state 1010 is entered from Discharge state 1008 when the SoC falls below SoCHibernatethreshold. In the Hibernate state, the pumps are turned OFF, Buck Boost is turned OFF, and the Cooling system algorithm is turned OFF. The temperature of the Electrolyte is recorded, the leak sensors are monitored for any leaks, and the components are monitored, recorded, and reported as was done in charge state 1014. State function 1000 will change from Hibernate state 1010 when the BBus power resumes or a fault occurs due to the loss of power of the stack 102 and state function 1000 transitions to shutdown 1012.

State function 1000 transitions to Shutdown state 1012 from any other state when an Error occurs. In this state all functions are disabled except for the monitoring functionality. The recovery from Shutdown state 1012 occurs by turning ON/OFF the BTS switch when the BBus power is available, by remote SMS command, or if entry is through the hibernate state 1010 and the BBUs voltage is greater than 52V.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A flow cell system, comprising:
   a stack, the stack including one or more individual flow cells each of the flow cells formed by a first half cell and a second half cell separated by a membrane;
   a first electrolyte storage tank holding a first electrolyte;
   a first pump coupled between the first electrolyte storage tank and the first half cell to circulate the first electrolyte through the first half cell;
   a second electrolyte storage tank holding a second electrolyte;
   a second pump coupled between the second electrolyte storage tank and the second half cell to circulate the second electrolyte through the second half cell;
   a first electrolyte heat exchanger coupled to receive the first electrolyte from the first half cell; and
   a second electrolyte heat exchanger coupled to receive the second electrolyte from the second half cell, wherein each of the first electrolyte heat exchanger and the second electrolyte heat exchanger includes:
   a plurality of flow field media;
   heat transfer sheets separating each of the plurality flow field media;
   a coolant flow system coupled to flow a coolant fluid through a first set of the plurality of flow field media; and
   a first pressure plate and a second pressure plate wherein the plurality of flow field media and the heat transfer sheets that separate the plurality of flow field media are fixedly held in place and sealed against exchange of electrolyte and the coolant fluid; and
   a first gasket inserted between the first pressure plate and a first one of the plurality of flow field media and a second gasket is inserted between the second pressure plate and a last one of the plurality of flow field media.

2. The flow cell of claim 1, wherein the coolant flow system includes a coolant pump.

3. The flow cell of claim 1, wherein electrolyte is flowed through a second set of the plurality of flow field media.

4. The flow cell of claim 3, wherein each flow field of the first set of the plurality of flow field media is separated by the next flow field of the first set of the plurality of flow field media by one of the second set of the plurality of flow field media.

5. The flow cell of claim 1, wherein the first pressure plate, the second pressure plate, the first gasket, the second gasket, the plurality of flow field media, and the heat transfer sheets are held under pressure by a set of tie rods and springs passing through alignment holes in the first pressure plate and the second pressure plate.

6. The flow cell of claim 1, further including a first manifold that receives and routes electrolyte through the second set of the plurality of flow field media and a second manifold that receives and routs coolant fluid through the first set of the plurality of flow field media.

7. the flow cell of claim 3, wherein the heat transfer sheets are formed of a plastic material.

8. The flow cell of claim 7, wherein the plurality of flow cell media are formed of a soft santoprene.

* * * * *